US012662886B2

(12) United States Patent
Radojevic et al.

(10) Patent No.: US 12,662,886 B2
(45) Date of Patent: Jun. 23, 2026

(54) WRENCH ASSEMBLY BUMPER PLATE SYSTEMS

(71) Applicant: Warrior Rig Technologies US LLC, Springtown, TX (US)

(72) Inventors: Dragan Radojevic, Azle, TX (US); Pavel Shpak, Azle, TX (US)

(73) Assignee: Patterson-UTI Drilling Company LLC, Houston, TX (US)

( * ) Notice: Subject to any disclaimer, the term of this patent is extended or adjusted under 35 U.S.C. 154(b) by 0 days.

(21) Appl. No.: 18/678,403

(22) Filed: May 30, 2024

(65) Prior Publication Data

US 2024/0410237 A1      Dec. 12, 2024

Related U.S. Application Data

(60) Provisional application No. 63/507,669, filed on Jun. 12, 2023.

(51) Int. Cl.
*E21B 19/16* (2006.01)
*B23P 6/00* (2006.01)

(52) U.S. Cl.
CPC .............. *E21B 19/161* (2013.01); *B23P 6/00* (2013.01)

(58) Field of Classification Search
CPC ........ E21B 19/16; E21B 19/161; E21B 19/18; E21B 19/24; B23P 6/00; B23P 19/00; B23P 19/001; B23P 19/002; B23P 19/006; B23P 19/007; B23P 19/02; B23P 19/027; B23P 19/04; B23P 19/043; B23P 19/06; B23P 19/061; B23P 19/069; B23P 19/10; B23P 19/12; B25B 21/00; B25B 21/002; B25B 21/007; B25B 23/00; B25B 23/02

See application file for complete search history.

(56) References Cited

U.S. PATENT DOCUMENTS

| | | | | |
|---|---|---|---|---|
| 4,099,429 A | * | 7/1978 | Hauk | E21B 19/168 |
| | | | | 81/57.2 |
| 5,823,074 A | * | 10/1998 | Ahlstone | E21B 19/161 |
| | | | | 81/57.2 |
| 10,087,691 B1 | * | 10/2018 | Tran | E21B 19/24 |
| 2009/0277308 A1 | * | 11/2009 | Light | E21B 19/164 |
| | | | | 81/57.16 |
| 2017/0370166 A1 | * | 12/2017 | Angelle | E21B 17/01 |
| 2019/0292821 A1 | * | 9/2019 | Gunner | E05D 5/12 |

FOREIGN PATENT DOCUMENTS

WO      WO-2015106343 A1 *   7/2015   ......... B25B 13/5016

* cited by examiner

*Primary Examiner* — Robert J Scruggs
(74) *Attorney, Agent, or Firm* — Chernoff, Vilhauer, McClung & Stenzel LLP

(57) ABSTRACT

Example systems for wrench assembly bumper plates. One example system may comprise a wrench assembly for assisting with attaching drill segments to, and/or separating drill segments from, a drill string. The wrench assembly may comprise a pair of arms. Each arm may comprise a bumper plate. The bumper plate may be shaped to be removably mountable to either of the pair of arms in a location where the bumper plate receives impact force when the arm makes contact with a drill segment.

22 Claims, 11 Drawing Sheets

- PRIOR ART -

110

116

110

116

116

116

WRENCH ASSEMBLY BUMPER PLATE SYSTEMS

REFERENCE TO RELATED APPLICATIONS

This application claims priority from, and the benefit under 35 USC 119 in relation to, U.S. application No. 63/507,669 filed 12 Jun. 2023 which is hereby incorporated herein by reference.

FIELD

This invention relates to wrench assemblies. Particular embodiments may have applications in oil and gas drill rigs.

BACKGROUND

So called "iron roughnecks" are commonly used in oil and gas applications to connect and disconnect segments of drill pipes. Iron roughnecks typically comprise wrench assemblies used to grasp pipe segments and to rotate them in relation to one another. Wrench assemblies within iron roughnecks typically sustain significant repeated impact forces (e.g., from pipe segments). Commonly, many of such impact forces are sustained by a so-called "bumper plate" positioned atop a housing which houses the relatively more sensitive mechanical and/or hydraulic parts of the wrench assembly. To protect the housing, there is a general need to replace the bumper plate from time to time, which may be because of wear and/or damage caused by repeated impact force, acute impact force or otherwise. Wear and/or damage caused by repeated impact force and/or acute impact force can shorten the service life of the bumper plate, resulting in a relatively more frequent need for replacement.

The replacement of prior art bumper plates is challenging. In addition to providing a function of a bumper plate to absorb impacts from pipe segments, prior art bumper plates provide a cover for access to the housing which houses, inter alia, the crown gear of the wrench assembly and prior art bumper plates engage with and maintain the positioning of one or more idler shafts (see e.g., FIG. 1 for an example prior art bumper plate 10 which covers an access (not shown) to an interior of housing 21 and which maintains the positions of idler shafts 14). Accordingly, when the prior art bumper plate 10 is replaced, housing 21 which holds the crown-gear must be opened, thereby exposing the crown gear and other relatively sensitive mechanical parts of the wrench assembly to contaminants or other sources of potential damage. If internal components (e.g., the crown gear and other relatively sensitive mechanical parts) are exposed to contaminants they are at an increased risk to fail prematurely. In addition, when it is desired to replace prior art bumper plates 10, care must be taken to ensure the proper treatment of the idler shafts 14 (e.g., positioning with new bumper plate, no displacement, etc.). Replacing prior art bumper plates may be time consuming, require significant skill and/or multiple parties.

Wrench assemblies commonly comprise first and second arms that come together to grasp and/or otherwise handle pipes. A bumper plate is commonly positioned atop each arm. Prior art bumper plates are designed such that a first bumper plate design is positioned atop the first arm and a second bumper plate design is positioned atop the second arm. First and second bumper plate designs are commonly specific to one of the first and second arms to account for the different directionalities and/or geometries of the first and second arms. However, the differences in the first and second bumper plate designs further complicate the bumper plate replacement process, as further time is required to ensure the correct replacement bumper plate design is chosen for a particular wrench arm.

Prior art bumper plates are commonly provided with a tubular level gauge positioned thereon. In use, the tubular level gauge is exposed to impact forces applied to the bumper plate which may cause the tubular level gauge to break.

There remains a desire for wrench assemblies with bumper plates that are easier to replace, reduce the exposure of internal components to contaminants during bumper plate replacement, reduce the time required to replace a bumper plate and/or reduce the costs associated with replacing a bumper plate.

SUMMARY

This invention has a number of aspects that may be applied together, individually and in any sub-combination. These include, without limitation:

improvements to wrench assemblies; and improvements to bumper plates for wrench assemblies.

One aspect of the invention provides a wrench assembly for assisting with attaching drill segments to, and/or separating drill segments from, a drill string. The wrench assembly comprises a pair of arms. Each arm comprises a bumper plate. The bumper plate is shaped to be removably mountable to either of the pair of arms in a location where the bumper plate receives impact force when the arm makes contact with a drill segment.

Each arm may further comprise a housing defining an interior that houses one or more other components (e.g., a crown gear) of the arm. Each arm may further comprise a cover plate removably mountable to the arm in a location spaced apart from the bumper plate to thereby cover an access to the interior of the housing.

For each arm, the bumper plate may be removably mountable to the arm in a manner such that the bumper plate may be removable from the arm while the cover plate remains mounted to the arm.

For each arm, the bumper plate may be removably mountable to the arm in a location where the bumper plate is removable from the arm while the cover plate remains mounted to the arm.

For each arm, the bumper plate may be separately embodied from the cover plate.

The cover plate may be shaped to be removably mountable to either of the pair of arms.

For each arm, when mounted, the cover plate may physically engage with one or more idler shafts to maintain the position of the one or more idler shafts.

Each arm may comprise a tubular level gauge. The tubular level gauge may be located on the arm in a location spaced apart from the bumper plate.

Each arm may further comprise a roller shaft supported (e.g., by one or more bearings) for rotational movement relative to the arm. Each arm may further comprise a seal carrier located between the roller shaft and the bumper plate.

Each arm may further comprise a hinge pin about which the arm is pivotable. The hinge pin may comprise at least one lubrication port through which lubrication can be introduced to the bearing surfaces of the hinge pin.

The hinge pin may be mounted to the arm using a pair of bushings.

Each arm may comprise a hinge pin lock which is shaped to be coupleable to the hinge pin of either arm.

Another aspect of the invention provides a kit for servicing an arm of a wrench assembly for assisting with attaching drill segments to, and/or separating drill segments from, a drill string. The kit comprises a bumper plate. The kit further comprises a cover plate embodied separately from the bumper plate. The bumper plate is shaped for mounting to the arm in a location where the bumper plate receives impact force when the arm makes contact with a drill segment. The cover plate is shaped for mounting to the arm in a location spaced apart from the bumper plate to thereby cover an access to an interior of a housing of the arm.

The bumper plate and cover plate together may be mountable to the arm in a place of an existing bumper plate.

The bumper plate and cover plate may be mountable to either arm of the wrench assembly.

The bumper plate may be removably mountable to the arm in a manner such that the bumper plate is removable from the arm while the cover plate remains mounted to the arm.

The bumper plate may be removably mountable to the arm in a location where the bumper plate is removable from the arm while the cover plate remains mounted to the arm.

When mounted, the cover plate may physically engage with one or more idler shafts to maintain the position of the one or more idler shafts on the arm.

Another aspect of the invention provides a replacement bumper plate for replacing an existing bumper plate of an arm of a wrench assembly for assisting with attaching drill segments to, and/or separating drill segments from, a drill string. The replacement bumper plate shaped for mounting to the arm in a location where the replacement bumper plate receives impact force when the arm makes contact with a drill segment and in a location spaced apart from a cover plate mounted to the arm to cover an access to an interior of a housing of the arm.

The replacement bumper plate may replace an existing bumper plate on either arm of the wrench assembly.

The replacement bumper plate may be removably mountable to the arm in a manner such that the replacement bumper plate is removable from the arm while the cover plate remains mounted to the arm.

The replacement bumper plate may be removably mountable to the arm in a location where the replacement bumper plate is removable from the arm while the cover plate remains mounted to the arm.

Another aspect of the invention provides a method for servicing an arm of a wrench assembly for assisting with attaching drill segments to, and/or separating drill segments from, a drill string. The method comprises mounting a bumper plate to the arm in a location where the bumper plate receives impact force when the arm makes contact with a drill segment. The method further comprises mounting a cover plate embodied separately from the bumper plate to the arm in a location spaced apart from the bumper plate to thereby cover an access to an interior of a housing of the arm.

Mounting the bumper plate and mounting the cover plate together may comprise replacing an existing bumper plate on the arm.

The bumper plate and cover plate may be mountable to either arm of the wrench assembly.

Mounting the bumper plate may comprise removably mounting the bumper plate to the arm in a manner such that the bumper plate is removable from the arm while the cover plate remains mounted to the arm.

Mounting the bumper plate may comprise removably mounting the bumper plate to the arm in a location where the bumper plate is removable from the arm while the cover plate remains mounted to the arm.

When mounted, the cover plate may physically engage with one or more idler shafts to maintain the position of the one or more idler shafts on the arm.

Another aspect of the invention provides a method for replacing an existing bumper plate with a replacement bumper plate on an arm of a wrench assembly for assisting with attaching drill segments to, and/or separating drill segments from, a drill string. The method comprises mounting the replacement bumper plate to the arm in a location where the replacement bumper plate receives impact force when the arm makes contact with a drill segment and in a location spaced apart from a cover plate mounted to the arm to cover an access to an interior of a housing of the arm.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 2:
FIG. 2 is a partial perspective view of one arm of an example wrench assembly according to a particular embodiment.
Figure 3:
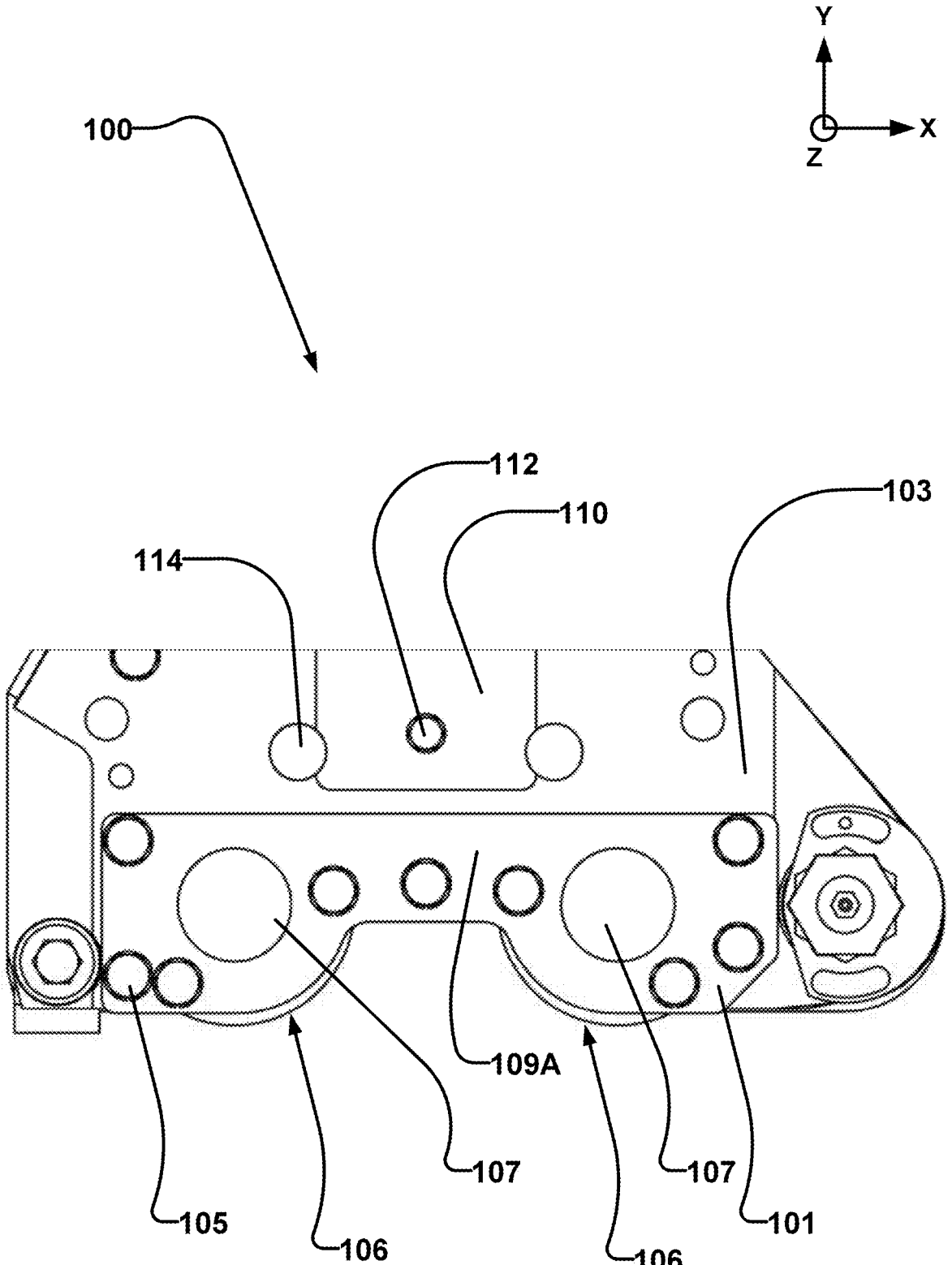
FIG. 3 is a partial top view of the FIG. 2 example wrench assembly.

FIG. 2 is a partial perspective view of an example wrench assembly 100 according to a particular embodiment. Wrench assembly 100 may comprise any suitable mechanical components in an iron roughneck assembly suitable for grasping pipe segments and rotating the pipe segments relative to one another. In some embodiments, wrench assembly 100 may be a part of an ST-80 iron roughneck manufactured or otherwise provided by a third party, such as NOV Inc., for example. Wrench assembly 100 may comprise any suitable components to fit with an ST-80 iron roughneck.

Figure 4A:
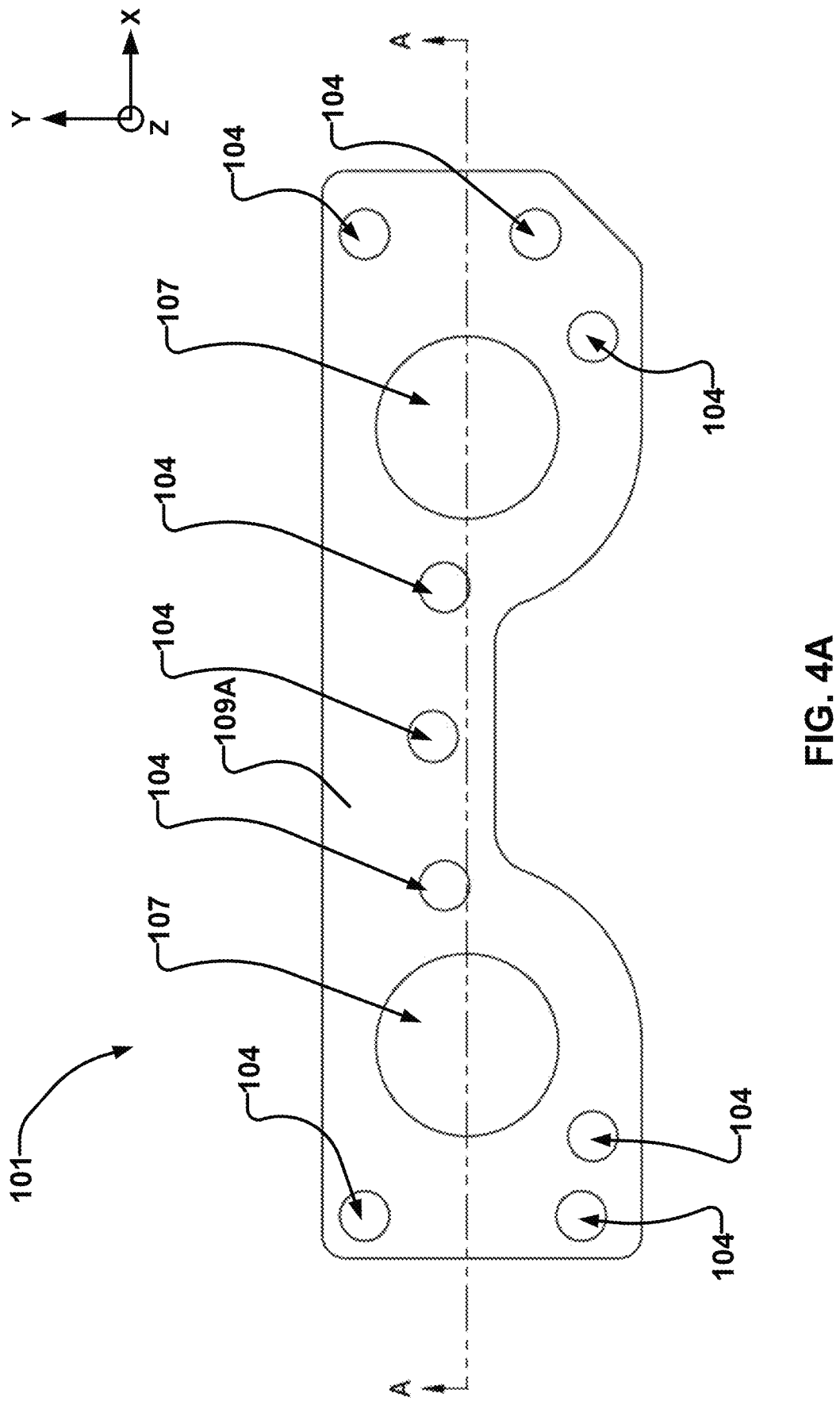
FIG. 4A is a top view schematic of an example bumper plate.
Figure 4B:
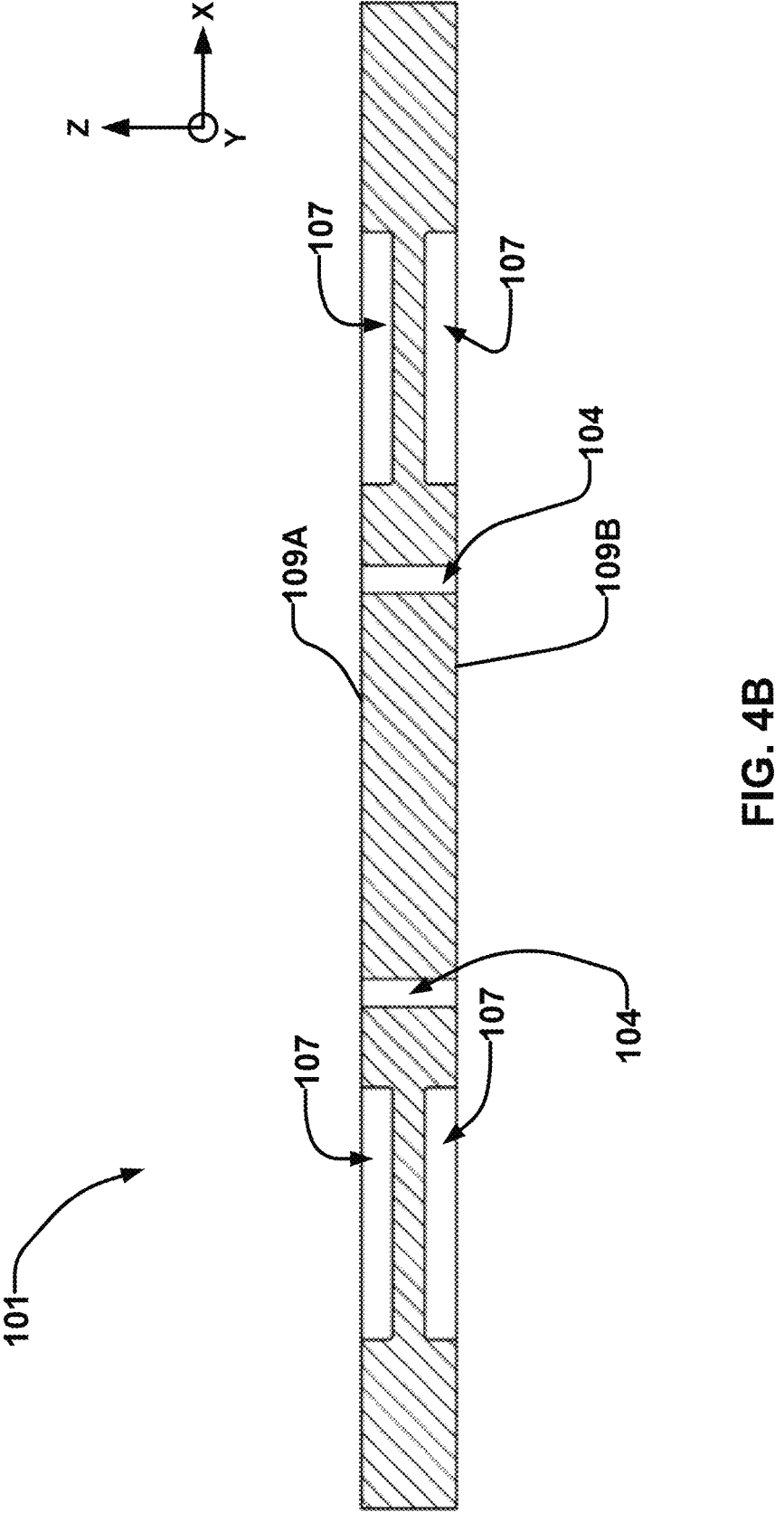
FIG. 4B is a cross-sectional view taken along the A-A line of the FIG. 4A example bumper plate.
Figure 4C:
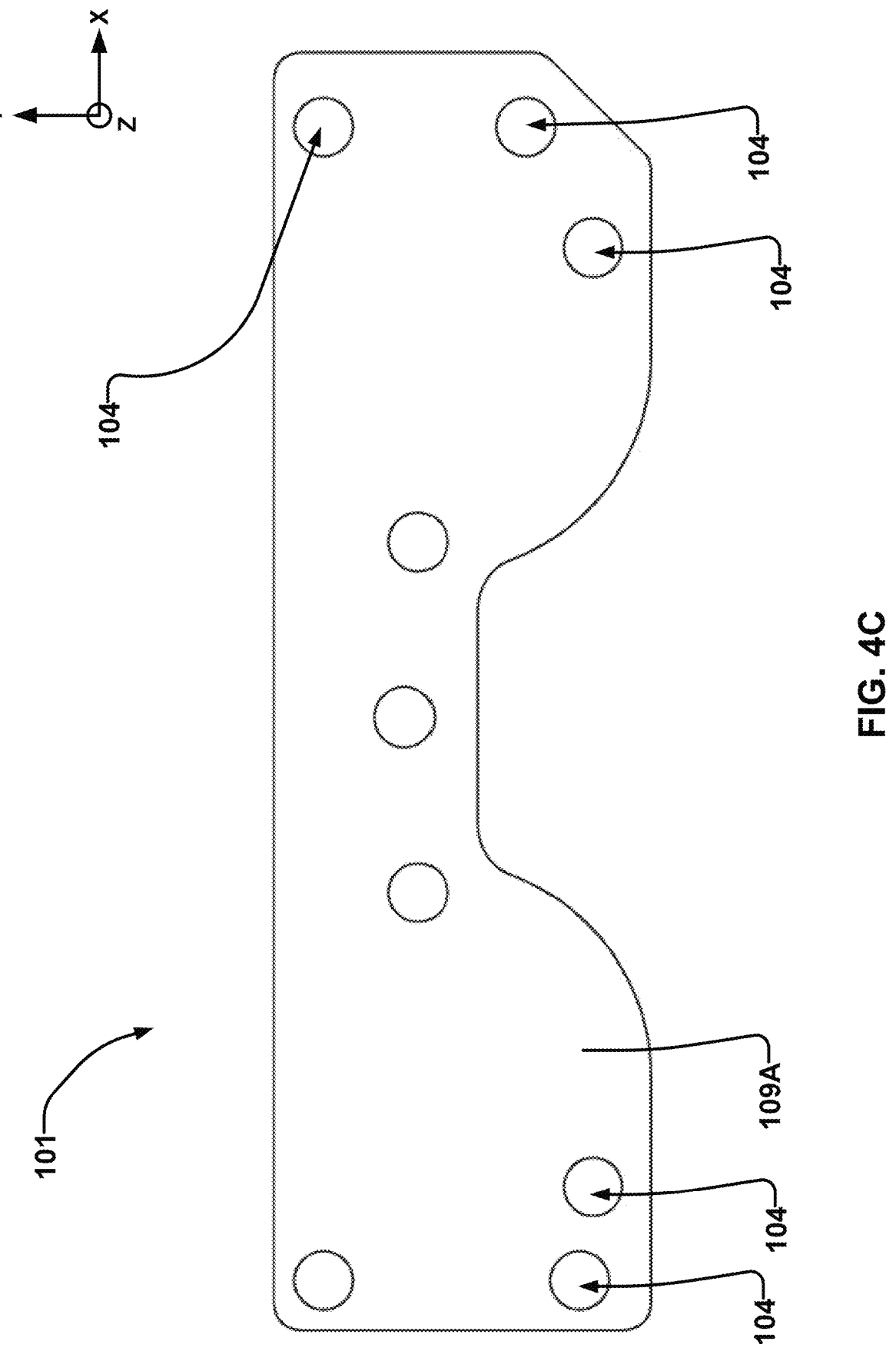
FIG. 4C is a top view schematic of an example bumper plate.

Wrench assembly 100 comprises bumper plate 101. Bumper plate 101 may be positioned and removably secured atop upper housing plate 103. Upper housing plate 103 may provide an opening (e.g., access) to a housing 121 which houses a crown gear 115 and/or other relatively sensitive mechanical components of wrench assembly 100. Bumper plate 101 may comprise one or more indentations 107 (individually referred to herein as indentation 107) on one or both of a first surface 109A and a second surface 109B (see e.g., FIGS. 2, 4A, 4B). Indentations 107 that are recessed from second surface 109B (see FIG. 4B) may allow bumper plate 101 to be positioned on upper housing plate 103 while accommodating structures (e.g., seal carriers 130 (see FIG. 7)) that protrude from upper housing plate 103 and/or require space for movement. Indentations 107 may be present on both first and second surfaces 109, 109B to allow one bumper plate to be used for (e.g., attached to) either of arms 102A, 102B or a spinner wrench assembly 100. Indentations 107 are optional. FIG. 4C illustrates a bumper plate 101' according to another embodiment. The FIG. 4C bumper plate 101' differs from bumper plate 101 primarily in that bumper plate 101' does not include indentations 107. In other respects, bumper plate 101' may be considered to have features similar to those of bumper plate 101.

Bumper plate 101 may be shaped to define one or more bores 104 (individually referred to herein as bore 104). A bolt 105 (collectively referred to herein as bolts 105) may extend through a bore 104 and engage with upper housing plate 103 and/or some other portion of housing 121) to secure bumper plate 101 atop upper housing plate 103 (see e.g., FIG. 7). Bolts 105 and bores 104 may be suitably dimensioned for this purpose.

Wrench assembly 100 comprises opposing arms 102A and 102B (see e.g., FIG. 8) that cooperate to provide grasping and relative rotation functionalities. Opposing arms 102A and 102B may engage with and/or grasp a respective pipe. A bumper plate 101 may be secured to each of arms 102A, 102B. Advantageously, bumper plate 101 is shaped (e.g., symmetrically shaped), so bumper plate 101 may be used for (e.g., attached to) either of arms 102A, 102B, unlike prior art bumper plates which are specific to one of the arms 102A, 102B of a wrench assembly. As discussed above, having indentations 107 on both first surface 109A and second surface 109B may allow bumper plate 101 to be used for (e.g., attached to) either of arms 102A, 102B.

Bumper plate 101 may be a sacrificial component of a wrench assembly 100 and/or one of arms 102A, 102B. Bumper plate 101 may experience impact force (e.g., from a drill pipe (not shown)) and such forces may be primarily directed in directions of the x-y plane (see x-, y- and z-axes illustrated in FIGS. 2-6). Impact force may be sustained by bumper plates 101 when wrench assembly 100 comes into contact with the drill pipe—e.g., when arms 102A, 102B are pivoted to engage with (contact) the drill pipe and/or when transverse movement of the drill pipe brings the drill pipe into contact with number plate(s) 101. The amount and/or direction of impact force sustained by bumper plate(s) 101 may be influenced by one or more of the relative momenta (e.g., directional velocity and mass) of wrench assembly 100, arm 102A, arm 102B and pipe when the pipe and bumper plate(s) come into contact.

To help to accommodate such impact forces, bumper plate 101 may be sized shaped, located and/or constructed from suitable materials. Bumper plate 101 may be any suitable shape. In some embodiments, bumper plate 101 may be shaped to cover (e.g., extend in the x-y plane over) at least a portion of one or both of rollers 106 (see, for example, FIGS. 2, 3 and 8). In some embodiments, bumper plate 101 may be shaped to overhang (extend in the x-y plane further than) housing 121 and/or upper housing plate 103 (see, for example, FIGS. 2, 3 and 8).

Bumper plate 101 may be replaced in the field. As explained in more detail below, replacing bumper plate 101 may be relatively simple compared to replacing prior art bumper plates and replacing bumper plate may mitigate the likelihood of damage to other parts of wrench assembly 100 (e.g., by contamination or otherwise) when compared to replacing prior art bumper plates.

Figure 1:
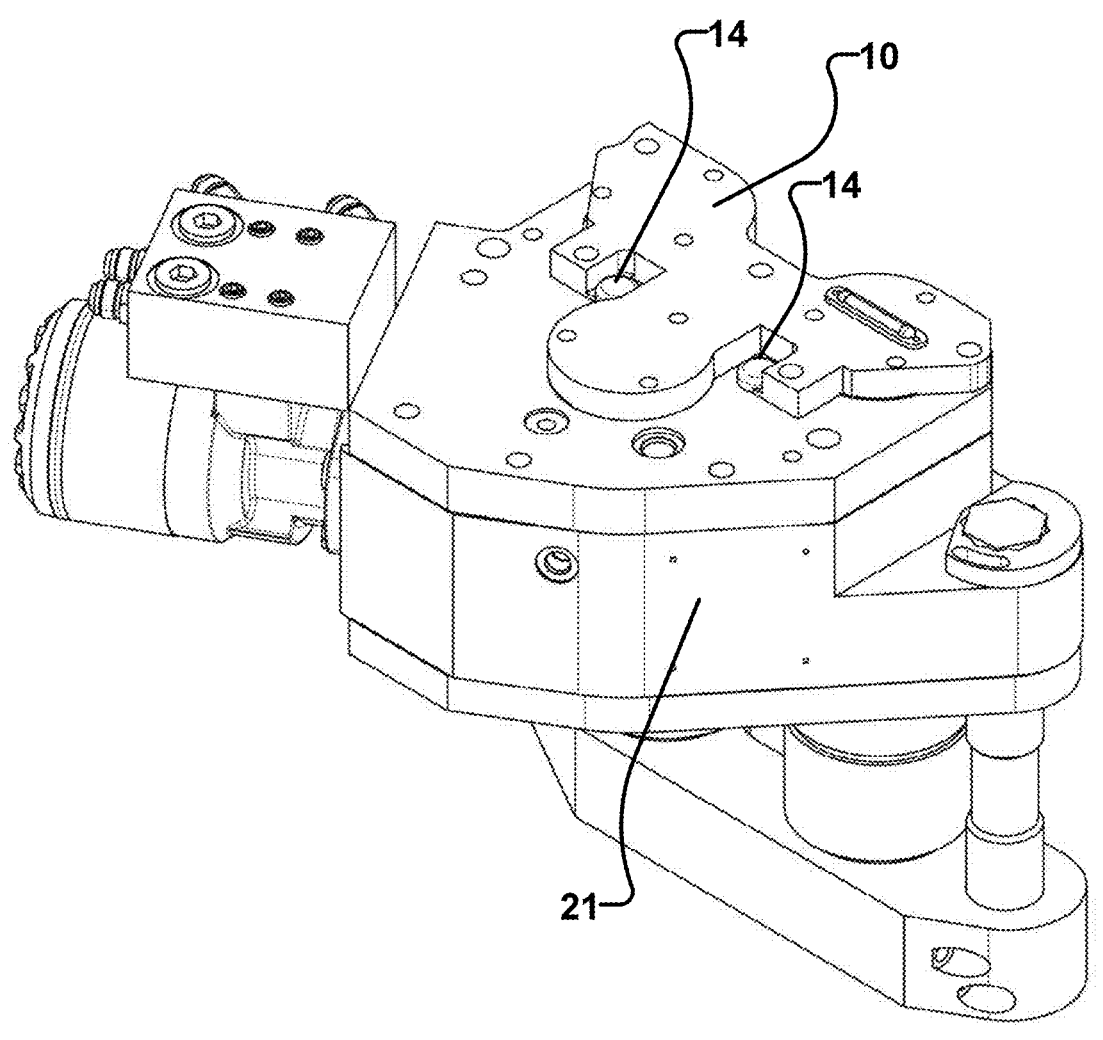
FIG. 1 is a partial perspective view of one arm of an example wrench assembly according to prior art.
Figure 5:
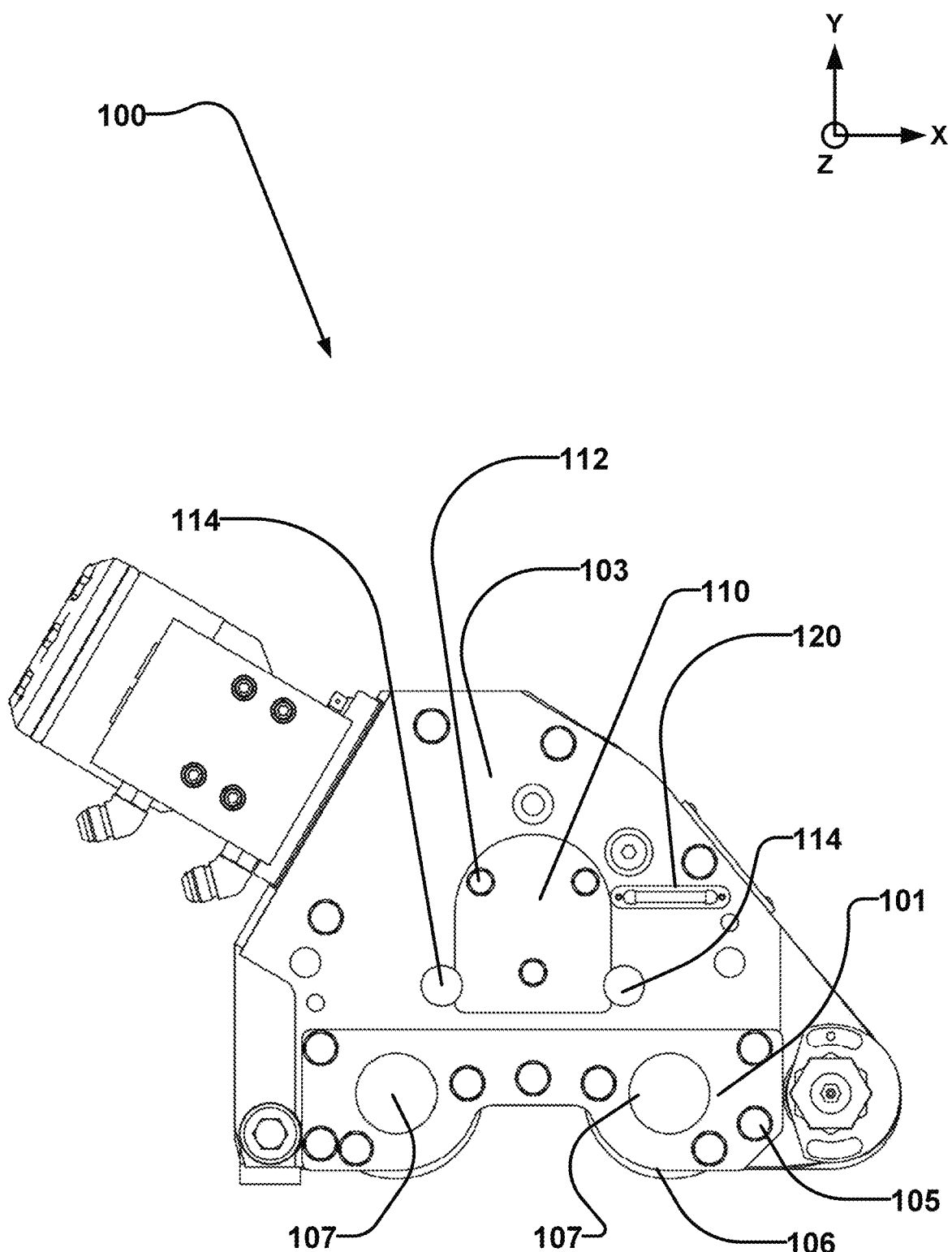
FIG. 5 is a top view of the FIG. 2 example wrench assembly.
Figures 6A, 6B:
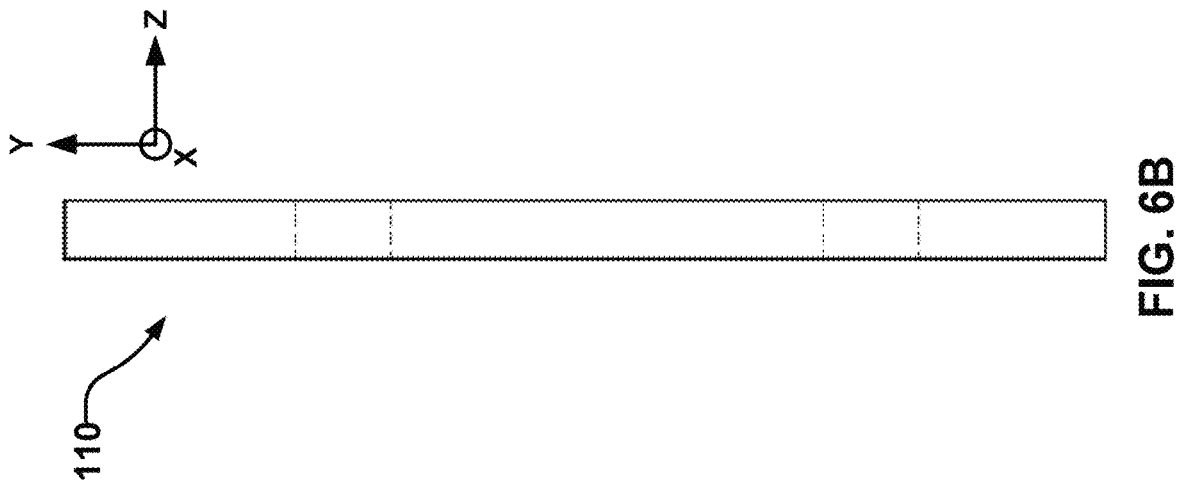
FIG. 6A is a top view schematic of an example cover plate.
FIG. 6B is a side view schematic of the FIG. 6A example cover plate.

Each arm 102A, 102B of wrench assembly 100 may further comprise cover plate 110 that is embodied separately from and spaced apart from bumper plate 101 (see e.g., FIGS. 2 and 5). The separate embodiment of cover plate 110 and bumper assembly 101 differs from prior art bumper plates (see FIG. 1), where the cover plate is integrally with the bumper plate and the functionality of the cover plate (explained in more detail below) is provided by the prior art bumper plate. In some embodiments, cover plate 110 may have one or more of the design, shaping and dimensions as shown in FIGS. 6A and 6B.

Each cover plate 110 may be positioned and removably secured atop its corresponding upper housing plate 103 (see e.g., FIG. 5) in a location spaced apart (e.g., in the x-y plane) from bumper plate 101. The x-y plane positioning of cover plate 110 on upper housing plate 103 may cover an access to an interior 121A of housing 121 (e.g., an aperture exposing an interior 121A of housing 121 which houses crown gear 115 (see e.g., FIG. 8) and other relatively more sensitive mechanical components of wrench assembly 100). Cover plate 110 may be shaped to define one or more bores 116 (individually referred to herein as bore 116). A bolt 112 (collectively referred to as bolts 112) may extend through a bore 116 and engage with upper housing plate 103 and/or other parts of housing 121 to secure cover plate 110 atop upper housing plate 103. In addition to covering the access to the interior 121A of housing 121, cover plate 110 may engage with (e.g., contact) and maintain the positioning of one or more idler shafts 114 (see, for example, FIGS. 2, 5 and 8). In prior art bumper plates, these two functions (covering the access to the interior 121A of housing 121 and supporting idler shafts 114) are performed by the bumper plate.

Because cover plate 110 is separately embodied from and spaced apart from bumper plate 101 and is located away from the zone of impact between bumper plate 101 and drill pipe segments, cover plate 110 does not sustain the same level of impact force and/or consequential damage as bumper plate 101. As such, it is not necessary to change cover plate 110 with the same frequency as changing bumper plate 101. Advantageously, when bumper plate 101 is damaged (e.g., due to impact force as described elsewhere herein), bumper plate 101 may be changed without changing or removing cover plate 110 from housing 121.

The ability to change bumper plate 101 without changing or removing cover plate 110 may make it relatively simple to change bumper plate 101 (when compared to prior art bumper plates), because there is no need to support shafts 114 when bumper plate 101 is changed and because there are fewer bolts to undo and replace. Changing prior art bumper plates requires some technique for supporting idler shafts 114 while the bumper plate is removed from the housing and prior to a replacement bumper plate being attached to the housing. Also, the ability to change bumper plate 101 without changing or removing cover plate 110 may mitigate the likelihood of damage to other parts of wrench assembly 100 (when compared to prior art bumper plates), because there is no need to expose the access to interior 121A of housing 121, since cover plate 110 remains in place. This contrasts with prior art bumper plates, which, when removed from housing 121, leave open the access to housing interior 121A which can in turn allow contaminants or other foreign objects to get into interior 121A of housing, where such contaminants/objects can cause damage to 115 and/or other sensitive parts of wrench assembly 100.

Figure 7:
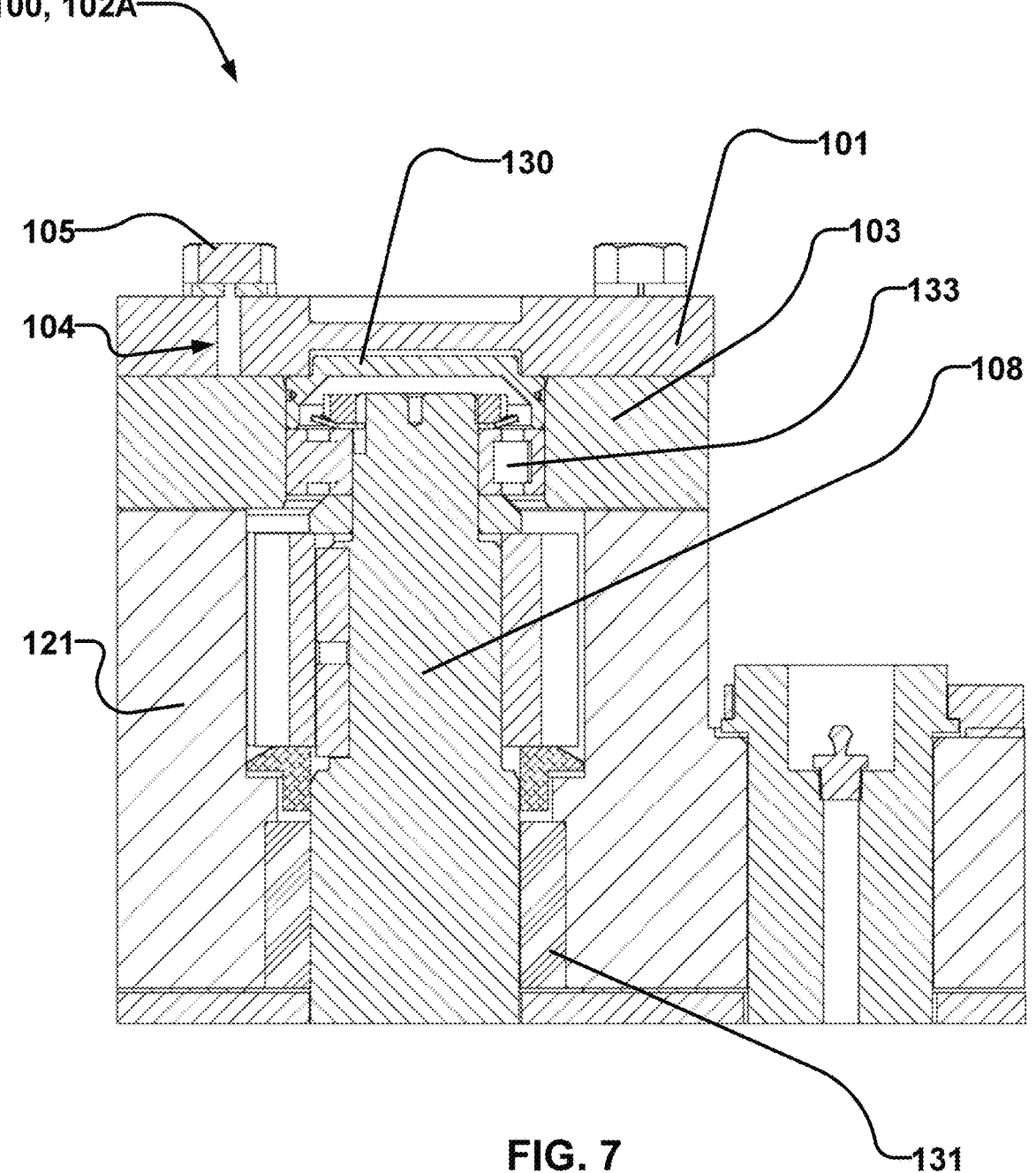
FIG. 7 is a partial cross-sectional view of one arm of the FIG. 2 example wrench assembly according to a particular embodiment.

FIG. 7 is a cross-sectional view of one arm 102A of wrench assembly 100 according to a particular embodiment. Arm 102A may comprise one or more seal carriers 130 (individually referred to as seal carrier 130). Seal carrier 130 may be positioned atop of roller shaft 108, bearings 131 and/or standard roller bearing 133. Standard roller bearing 133 may comprise a standard roller bearing as manufactured by or provided by any third party, for example AB SKF. Seal carrier 130 may be positioned, at least partially, within upper housing plate 103. One or more O-rings may form a seal between upper housing plate 103 and seal carrier 130. Seal carrier 130 may protect roller shaft 108, bearings 131 and/or standard roller bearing 133 from contaminants if bumper plate 101 is damaged or removed. Seal carrier 130 need not be replaced when bumper plate 101 is changed. It follows that roller shaft 108, bearings 131 and/or standard roller bearing 133 remain covered (by seal carrier 130) when bumper plate 101 is changed, thereby reducing the entrance of debris into a vicinity of roller shaft 108, bearings 131, standard roller bearing 133 and/or regions of wrench assembly 101 that are contiguous with one or more of bearings roller shaft 108, bearings 131 and standard roller bearing 133. Prior art wrench assemblies cover roller shafts 108, bearings 131 and/or standard roller bearing 133 with a single piece bumper plate which leave roller shafts 108, bearings 131 and/or standard roller bearing 133 uncovered and open to debris when the single piece bumper plate is removed. In relation to bumper plate 101, indentations 107 may provide clearance for seal carriers 130.

Figure 8:
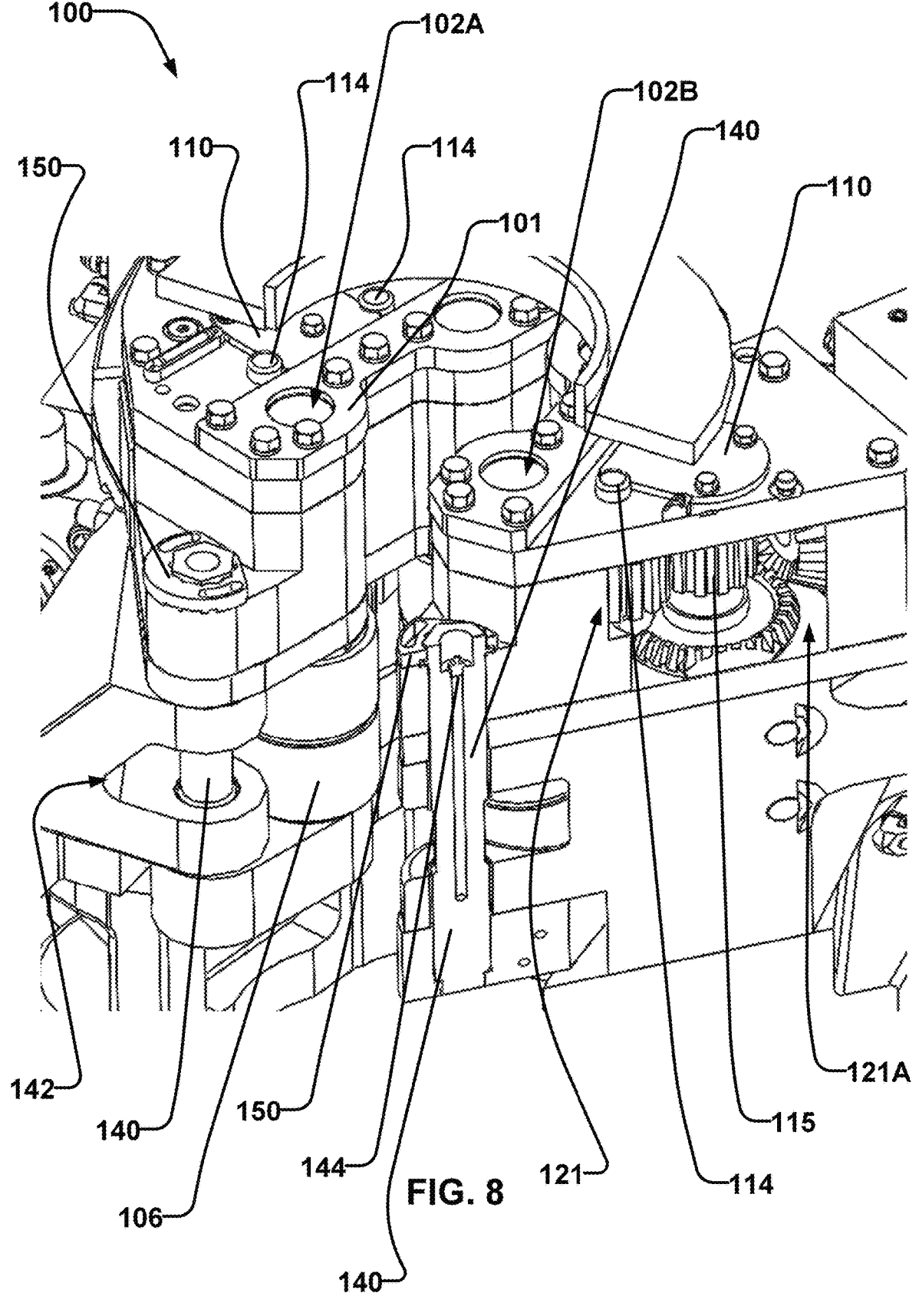
FIG. 8 is a partial cross-sectional view of the FIG. 2 example wrench assembly according to a particular embodiment.

FIG. 8 is a partial cross-sectional view of wrench assembly 100 according to a particular embodiment. Each arm 102A, 102B of wrench assembly 100 may comprise improved hinge pin 140. Each arm 102A, 102B of wrench assembly 100 pivots on a corresponding hinge pin 140. Hinge pin 140 may be mounted to upper jaw 142. Hinge pin 140 may be mounted by a set of two bushings. The bushings may be made of bronze. Prior art hinge pins tend to wear out because of the high friction present on the contact surfaces of the prior art hinge pins. Hinge pin 140 may comprise lubrication ports 144. Lubrication portions 144 (together with proper greasing) may alleviate some friction that would otherwise be experienced by hinge pin 140 in turn prolonging the operational life of hinge pin 140.

Figure 9:
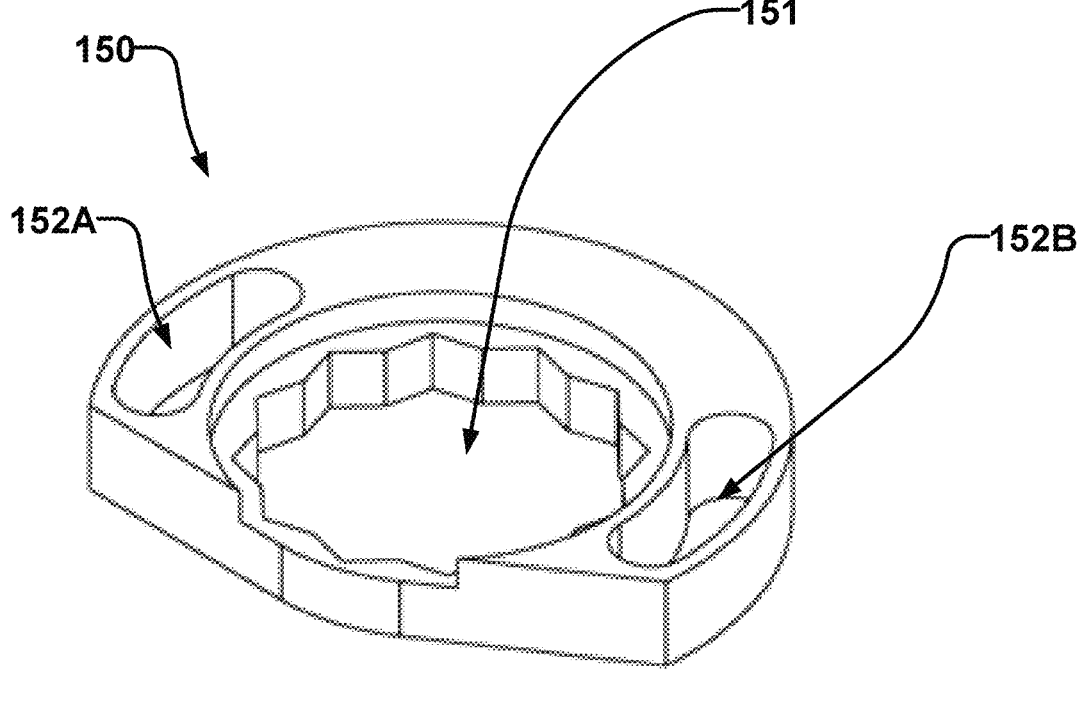
FIG. 9 is a top view of an example hinge pin lock.

Wrench assembly 100 may comprise hinge pin lock 150 (see e.g., FIGS. 8 and 9). Hinge pin lock 150 may be shaped to define a bore 151. Hinge pin 140 may extend through bore 151 to secure hinge pin 140 relative to hinge pin lock 150. Hinge pin lock 150 may comprise bolting slot 152A and bolting slot 152B (collectively referred to herein as bolting slots 152). Providing hinge pin lock 150 with two bolting slots 152 advantageously allows a hinge pin lock 150 to be securable to either arm 102A or arm 102B. In contrast, prior art hinge pin lock designs include only one bolting slot which require a first hinge pin lock design for arm 102A and a second hinge pin lock design for arm 102B.

In some embodiments, roller shaft bearings may comprise plastic bushings. In some embodiments, the plastic bushings may comprise Igus iGlide™ Bushings. Plastic bushings may advantageously be relatively less susceptible to damage due to contamination than traditional bearings.

Wrench assembly 100 further comprises tubular level gauge 120. Tubular level gauge 120 is positioned on upper housing plate 103. Tubular level gauge 120 may be positioned in an area that does not receive direct impact force. Tubular level gauge 120 may not receive direct impact force. Any impact force received by level gauge 120 may be indirect and may be mitigated by bumper plate 101. Unlike prior art bumper plates, where the level gauge sits on the bumper plate, this location of level gauge 120 (away from bumper plate 101) means that level gauge 120 sustains less damage than bumper plate 101 and then bumper plate 101 may be changed without changing level gauge 120.

Upper housing plate 103 may be shaped to define one or more holes. The one or more holes may accommodate fasteners (e.g., screws, bolts, pins, etc.) to secure bumper plate 101 and/or tubular level gauge 120 to upper housing plate 103. Some of the holes may be tapped or otherwise internally threaded. The holes may have different diameters. The holes may have different hole patterns.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g., a bumper plate, cover plate, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

The invention has a number of non-limiting aspects. Non-limiting aspects of the invention include:

1. A wrench assembly for assisting with attaching drill segments to, and/or separating drill segments from, a drill string, the wrench assembly comprising:
  a pair of arms, each arm comprising:
    a bumper plate shaped to be removably mountable to either of the pair of arms in a location where the bumper plate receives impact force when the arm makes contact with a drill segment.

2. The wrench assembly of aspect 1 or any other aspect herein wherein each arm further comprises:
  a housing defining an interior that houses one or more other components (e.g., a crown gear) of the arm;

a cover plate removably mountable to the arm in a location spaced apart from the bumper plate to thereby cover an access to the interior of the housing.

3. The wrench assembly of aspect 2 or any other aspect herein wherein, for each arm, the bumper plate is removably mountable to the arm in a manner such that the bumper plate is removable from the arm while the cover plate remains mounted to the arm.

4. The wrench assembly of any one of aspects 2 to 3 or any other aspect herein wherein, for each arm, the bumper plate is removably mountable to the arm in a location where the bumper plate is removable from the arm while the cover plate remains mounted to the arm.

5. The wrench assembly of any one of aspects 2 to 4 or any other aspect herein wherein, for each arm, the bumper plate is separately embodied from the cover plate.

6. The wrench assembly of any one of aspects 2 to 5 or any other aspect herein wherein the cover plate is shaped to be removably mountable to either of the pair of arms.

7. The wrench assembly of any one of aspects 2 to 6 or any other aspect herein wherein, for each arm, when mounted, the cover plate physically engages with one or more idler shafts to maintain the position of the one or more idler shafts.

8. The wrench assembly of any one of aspects 1 to 7 or any other aspect herein wherein each arm comprises a tubular level gauge, the tubular level gauge located on the arm in a location spaced apart from the bumper plate.

9. The wrench assembly of any one of aspects 1 to 8 or any other aspect herein wherein each arm further comprises: a roller shaft supported (e.g., by one or more bearings) for rotational movement relative to the arm; and a seal carrier located between the roller shaft and the bumper plate.

10. The wrench assembly of any one of aspects 1 to 9 or any other aspect herein wherein each arm further comprises a hinge pin about which the arm is pivotable, the hinge pin comprising at least one lubrication port through which lubrication can be introduced to the bearing surfaces of the hinge pin.

11. The wrench assembly of aspect 10 or any other aspect herein wherein the hinge pin is mounted to the arm using a pair of bushings.

12. The wrench assembly of any one of aspects 10 to 11 or any other aspect herein wherein each arm comprises a hinge pin lock which is shaped to be coupleable to the hinge pin of either arm.

13. A kit for servicing an arm of a wrench assembly for assisting with attaching drill segments to, and/or separating drill segments from, a drill string, the kit comprising:
  a bumper plate; and
  a cover plate embodied separately from the bumper plate;
  wherein the bumper plate is shaped for mounting to the arm in a location where the bumper plate receives impact force when the arm makes contact with a drill segment;
  wherein the cover plate is shaped for mounting to the arm in a location spaced apart from the bumper plate to thereby cover an access to an interior of a housing of the arm.

14. The kit of aspect 13 or any other aspect herein wherein the bumper plate and cover plate together are mountable to the arm in a place of an existing bumper plate.

15. The kit of any one of aspects 13 to 14 or any other aspect herein wherein the bumper plate and cover plate are mountable to either arm of the wrench assembly.

16. The kit of any one of aspects 13 to 15 or any other aspect herein wherein the bumper plate is removably mountable to the arm in a manner such that the bumper plate is removable from the arm while the cover plate remains mounted to the arm.

17. The kit of any one of aspects 13 to 16 or any other aspect herein wherein the bumper plate is removably mountable to the arm in a location where the bumper plate is removable from the arm while the cover plate remains mounted to the arm.

18. The kit of any one of aspects 13 to 17 or any other aspect herein wherein, when mounted, the cover plate physically engages with one or more idler shafts to maintain the position of the one or more idler shafts on the arm.

19. The kit of any one of aspects 13 to 18 or any other aspect herein comprising any of the features, combinations of features and/or sub-combinations of features of any of the other aspects herein.

20. A replacement bumper plate for replacing an existing bumper plate of an arm of a wrench assembly for assisting with attaching drill segments to, and/or separating drill segments from, a drill string, the replacement bumper plate shaped for mounting to the arm in a location where the replacement bumper plate receives impact force when the arm makes contact with a drill segment and in a location spaced apart from a cover plate mounted to the arm to cover an access to an interior of a housing of the arm.

21. The replacement bumper plate of aspect 20 or any other aspect herein wherein the replacement bumper plate can replace an existing bumper plate on either arm of the wrench assembly.

22. The replacement bumper plate of any one of aspects 20 to 21 or any other aspect herein wherein the replacement bumper plate is removably mountable to the arm in a manner such that the replacement bumper plate is removable from the arm while the cover plate remains mounted to the arm.

23. The replacement bumper plate of any one of aspects 20 to 22 or any other aspect herein wherein the replacement bumper plate is removably mountable to the arm in a location where the replacement bumper plate is removable from the arm while the cover plate remains mounted to the arm.

24. The replacement bumper plate of any one of aspects 20 to 23 or any other aspect herein comprising any of the features, combinations of features and/or sub-combinations of features of any of the other aspects herein.

25. A method for servicing an arm of a wrench assembly for assisting with attaching drill segments to, and/or separating drill segments from, a drill string, the method comprising:

mounting a bumper plate to the arm in a location where the bumper plate receives impact force when the arm makes contact with a drill segment; and mounting a cover plate embodied separately from the bumper plate to the arm in a location spaced apart from the bumper plate to thereby cover an access to an interior of a housing of the arm.

26. The method of aspect 25 or any other aspect herein wherein mounting the bumper plate and mounting the cover plate together comprise replacing an existing bumper plate on the arm.

27. The method of any one of aspects 25 to 26 or any other aspect herein wherein the bumper plate and cover plate are mountable to either arm of the wrench assembly.

28. The method of any one of aspects 25 to 27 or any other aspect herein wherein mounting the bumper plate comprises removably mounting the bumper plate to the arm in a manner such that the bumper plate is removable from the arm while the cover plate remains mounted to the arm.

29. The method of any one of aspects 25 to 28 or any other aspect herein wherein mounting the bumper plate comprises removably mounting the bumper plate to the arm in a location where the bumper plate is removable from the arm while the cover plate remains mounted to the arm.

30. The method of any one of aspects 25 to 29 or any other aspect herein wherein, when mounted, the cover plate physically engages with one or more idler shafts to maintain the position of the one or more idler shafts on the arm.

31. The method of any one of aspects 25 to 30 or any other aspect herein comprising any of the features, combinations of features and/or sub-combinations of features of any of the other aspects herein.

32. A method for replacing an existing bumper plate with a replacement bumper plate on an arm of a wrench assembly for assisting with attaching drill segments to, and/or separating drill segments from, a drill string, the method comprising: mounting the replacement bumper plate to the arm in a location where the replacement bumper plate receives impact force when the arm makes contact with a drill segment and in a location spaced apart from a cover plate mounted to the arm to cover an access to an interior of a housing of the arm.

33. The method of aspect 32 or any other aspect herein comprising any of the features, combinations of features and/or sub-combinations of features of any of the other aspects herein.

34. Apparatus having any new and inventive feature, combination of features, or sub-combination of features as described herein.

35. Methods having any new and inventive steps, acts, combination of steps and/or acts or sub-combination of steps and/or acts as described herein.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A wrench assembly for assisting with attaching drill segments to, and/or separating drill segments from, a drill string, the wrench assembly comprising:

a pair of arms, each arm comprising a bumper plate shaped to be separately removably mountable to both:

a first one of the pair of arms in a first arm impact location where the bumper plate receives impact force when the first one of the arms makes contact with a drill segment; or a second one of the pair of arms in a second arm impact location where the bumper plate receives impact force when the second one of the arms makes contact with the drill segment.

2. The wrench assembly of claim 1 wherein each arm further comprises:

a housing defining an interior that houses one or more other components of the arm;

a cover plate removably mountable to the arm in a location spaced apart from the bumper plate to thereby cover an access to the interior of the housing.

3. The wrench assembly of claim 2 wherein, for each arm, the bumper plate is removably mountable to the arm in a manner such that the bumper plate is removable from the arm while the cover plate remains mounted to the arm.

4. The wrench assembly of claim 2 wherein, for each arm, the bumper plate is removably mountable to the arm in a location where the bumper plate is removable from the arm while the cover plate remains mounted to the arm.

5. The wrench assembly of claim 2 wherein, for each arm, the bumper plate is separately embodied from the cover plate.

6. The wrench assembly of claim 2 wherein the cover plate is shaped to be separately removably mountable to both the first one of the pair of arms, or the second one of the pair of arms.

7. The wrench assembly of claim 2 wherein, for each arm, when mounted, the cover plate physically engages with one or more idler shafts to maintain a position of the one or more idler shafts.

8. The wrench assembly of claim 1 wherein each arm comprises a tubular level gauge, the tubular level gauge located on the arm in a location spaced apart from the bumper plate.

9. The wrench assembly of claim 1 wherein each arm further comprises: a roller shaft supported for rotational movement relative to the arm; and a seal carrier located between the roller shaft and the bumper plate.

10. The wrench assembly of claim 1 wherein each arm further comprises a hinge pin about which the arm is pivotable, the hinge pin comprising at least one lubrication port through which lubrication can be introduced to bearing surfaces of the hinge pin.

11. The wrench assembly of claim 10 wherein the hinge pin is mounted to the arm using a pair of bushings.

12. The wrench assembly of claim 1 wherein each arm comprises a hinge pin lock which is shaped to be separately coupleable to the hinge pin of both the first one of the pair of arms or the second one of the pair of arms.

13. A kit for servicing an arm of a wrench assembly for assisting with attaching drill segments to, and/or separating drill segments from, a drill string, the kit comprising:

a bumper plate; and a cover plate embodied separately from the bumper plate;

wherein the bumper plate is shaped for mounting to the arm in a location where the bumper plate receives impact force when the arm makes contact with a drill segment;

wherein the cover plate is shaped for mounting to the arm in a location spaced apart from the bumper plate to thereby cover an access to an interior of a housing of the arm.

14. The kit of claim 13 wherein the bumper plate and cover plate together are mountable to the arm in a place of an existing bumper plate.

15. The kit of claim 13 wherein the arm is one of a pair of arms, and the bumper plate and cover plate are separately mountable to both a first one of the pair of arms of the wrench assembly, or a second one of the pair of arms of the wrench assembly.

16. The kit of claim 13 wherein the bumper plate is removably mountable to the arm in a manner such that the bumper plate is removable from the arm while the cover plate remains mounted to the arm.

17. The kit of claim 13 wherein the bumper plate is removably mountable to the arm in a location where the bumper plate is removable from the arm while the cover plate remains mounted to the arm.

18. The kit of claim 13 wherein, when mounted, the cover plate physically engages with one or more idler shafts to maintain a position of the one or more idler shafts on the arm.

19. A replacement bumper plate for replacing an existing bumper plate of an arm of a wrench assembly for assisting with attaching drill segments to, and/or separating drill segments from, a drill string, the replacement bumper plate shaped for mounting to the arm in a location where the replacement bumper plate receives impact force when the arm makes contact with a drill segment and in a location spaced apart from a cover plate mounted to the arm to cover an access to an interior of a housing of the arm.

20. The replacement bumper plate of claim 19 wherein the arm is one of a pair of arms, and the replacement bumper plate can separately replace an existing bumper plate on both a first one of the pair of arms of the wrench assembly, or a second one of the pair of arms of the wrench assembly.

21. The replacement bumper plate of claim 19 wherein the replacement bumper plate is removably mountable to the arm in a manner such that the replacement bumper plate is removable from the arm while the cover plate remains mounted to the arm.

22. The replacement bumper plate of claim 19 wherein the replacement bumper plate is removably mountable to the arm in a location where the replacement bumper plate is removable from the arm while the cover plate remains mounted to the arm.

\* \* \* \* \*